May 31, 1927.

E. B. CUSHMAN

INTERNAL COMBUSTION ENGINE

Filed Feb. 16, 1924

Inventor
Everett B. Cushman
By Stuart C. Barnes
Attorney

Patented May 31, 1927.

1,630,527

UNITED STATES PATENT OFFICE.

EVERETT B. CUSHMAN, OF LANSING, MICHIGAN.

INTERNAL-COMBUSTION ENGINE.

Application filed February 16, 1924. Serial No. 693,214.

This invention relates to internal combustion engines and has for its object an internal combustion engine in which the combustion chamber, the valves, spark plug and the intake and exhaust passage are so arranged so as to accomplish certain definite results calculated to achieve better efficiency and operation in the engine.

It has recently been recognized that it is desirable to prevent the dilution of the fuel gases in spots by the exhaust gases still remaining in the engine cylinder after the scavenging stroke of the piston. When the exhaust gases mix with the intake gases in unequal parts in different parts of the cylinder, very inefficient operation of the engine takes place for the combustible fuel is not all burned and hence all the energy is not extracted from the charge. It has been sought to overcome this by setting up a turbulence in the combustion chamber calculated to uniformly mix the burned gases with the incoming gases. It is the object of my invention to accomplish similar results in quite a different way.

I arrange the valves, the combustion chamber and the passageways so that the burned gases remaining in the combustion chamber are all trapped adjacent the head of the piston and at a point remote from the spark plug so as to keep this member as free from carbon and other deposits as possible.

A still further object of my invention is to prevent crank case dilution and the washing off of the lubrication on the cylinder and piston walls by means of the accumulation of raw fuel. Engine experts have recently more thoroughly recognized the evils of crank case dilution and various efforts have been made to overcome this difficulty with more or less indifferent success. I have so arranged my passageways and valves that any raw fuel coming into the combustion chamber is dropped and retained on the exhaust valve and blown out on the next scavenging stroke of the motor. This eliminates the possibility of its accumulating on the piston head and finding its way into the crank case. The combustion chamber is so arranged as to present a barrier to the raw fuel getting into the cylinder chamber. This will be more fully explained as the construction is described in detail.

Figure 1:
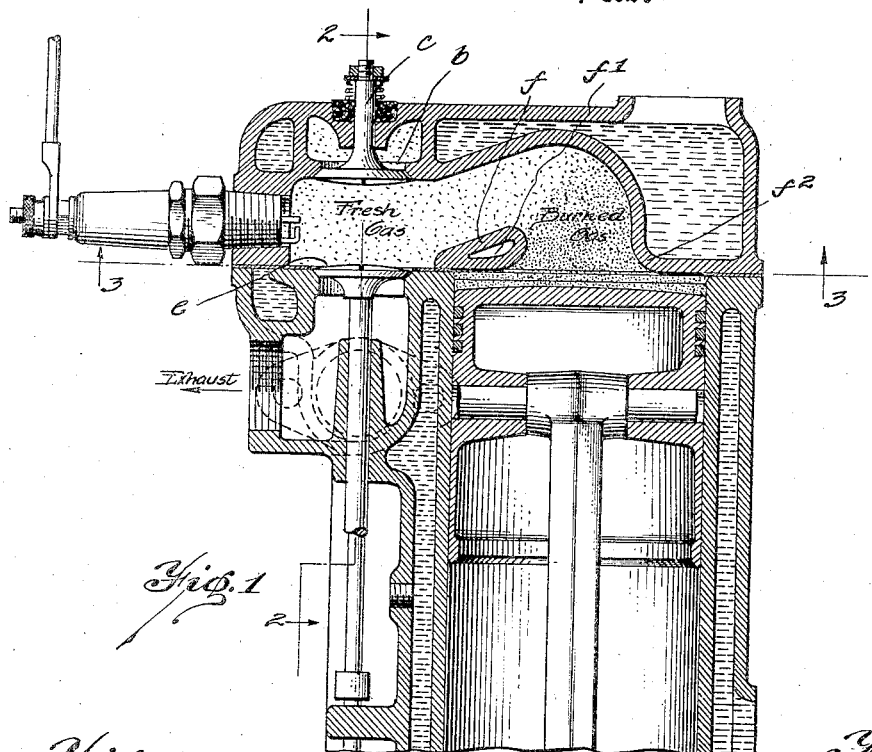
Fig. 1 is a vertical section of a motor, the lower part being omitted.
Figure 3:
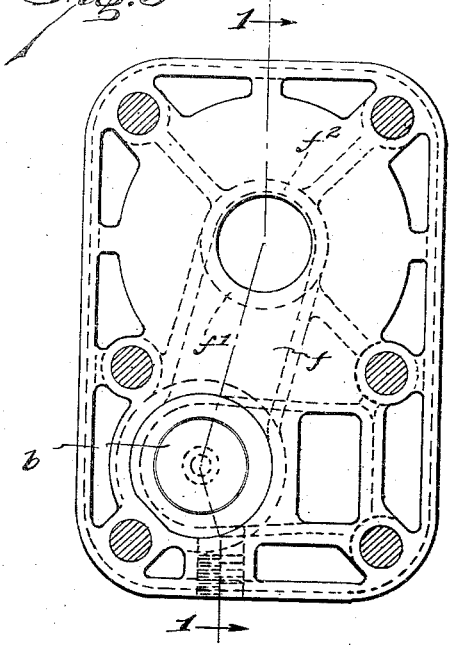
Fig. 3 is a section on the line 3—3 of Fig. 1.
Figure 2:
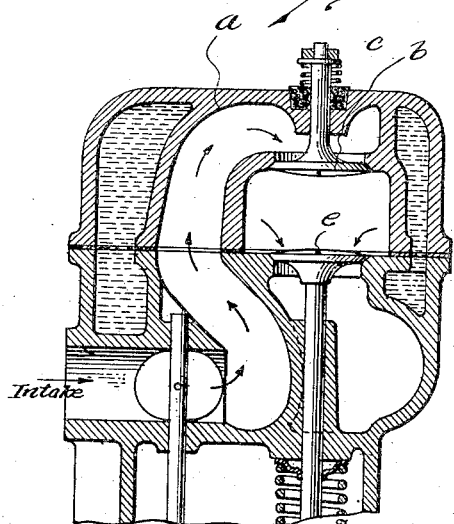
Fig. 2 is a section on the line 2—2 of Fig. 1.

The motor is what is familiarly known as an L head motor, but the specific arrangement of the combustion chamber, the valves, passageway and spark plug is, so far as I am aware, new. The engine block and the engine head casting are suitably cored to provide an upgoing intake passage $a$, which discharges through the intake port $b$ which is guarded by a suction controlled intake valve $c$ (although obviously the intake valve could be controlled by any positive mechanical means). By providing this steep upgoing intake passage $a$, this is calculated to sift out a large amount of the raw not finely divided fuel oil. This is calculated to fall by gravity in making the ascension through this upgoing leg of the intake track. However, any heavy particles that are carried over through the intake port are calculated to drop onto the exhaust valve $e$ which is directly below the intake port. Contrary to the usual practice in an L head motor, the offset portion of the combustion chamber does not open directly and freely into the cylinder portion of the combustion chamber, but a barrier or baffle $f$ is inserted directly at the entrance into the piston chamber. This barrier is suitably water-cooled by being cored out as at $f^1$. This is quite desirable and necessary as this barrier is directly in the path of the burning gases and is subjected to a very high heat. This barrier or baffle has two distinct objects. One is that it serves to erect a barrier in the path of the incoming gases and will require these gases after they have been turned down to again turn and pass upwardly before they enter the piston chamber. This turning action is calculated to separate the raw or heavy particles of fuel by inertia. There are three turns in the intake track where this is calculated to occur, namely, at the bottom of the upgoing intake passageway, at the top of the upgoing intake passageway where the fuel oil turns downwardly and immediately above the exhaust valve where the incoming gases turn to again make a trip over the barrier. The separation at those points is more efficient I believe than the several turns for the reason that at this point both gravity and the inertia principle work most effectively together. The down speed of the gases together with the sudden turn required in passing over the barrier is calculated both to drop the heavy particles by gravity and cause them to impinge upon the exhaust valve by reason of the inertia they have acquired in the downward direction due to the suction draft. Obviously on the scavenging stroke of the motor they are immediately in the path of the expelling gases so as to be easily blown out through the exhaust.

We have already adverted to a second function of the barrier $f$. This serves to form a trap for the burned gases so as to prevent incoming gases from forcing the burned gases back around in a circle or whirl to mix with the fresh incoming gases. In short, the barrier together with the shape of the other parts serves to prevent the very turbulence which has been the object of some engine designers to achieve for the purpose of intimately mixing the incoming and burned gases. It is my purpose to prevent this turbulence and operate on quite an opposite principle of isolating the burned gases from the fresh gases. It is also my purpose in this connection to make a long and narrow combustion chamber and as nearly completely as possible isolate the burned gases in one end and the incoming gases in the other end. At such other end I locate the spark plug so that the spark plug is in a large measure isolated from the burned gases. This avoids the deposit of carbon and other injurious matter from the burned gases. At the same time, the spark plug is very close to the sweep of the incoming gases which are calculated to keep the points clean and uncontaminated.

Still a further feature is that the spark plug is at a point remote from the cylinder. Oil pumping is one of the banes of engine operation. By placing the spark plug at the remote end of this narrow passage and interposing the barrier $f$, it will be seen that it will be very difficult for the oil which finds its way by the piston to work up onto the spark plug.

It also must be borne in mind that not only does the barrier $f$ serve to accomplish the functions that we have already specified, but the remaining construction of the cylinder head serves in much the same way as the barrier. Instead of having the customary hollow-domed construction common in most engine designs, the opening in the head communicating with the opening in the piston chamber is of relatively small diameter. This forms a continuation of the barrier as at $f^2$, where the engine head wall dips directly over the cylinder. This continuation of the barrier in a measure accomplishes the same functions in trapping the gases, excluding the entry of the raw fuel and protecting the spark plug from oil pumped up along the cylinder walls. In order to make the claims definite the barrier may be considered as constituting both the baffle $f$ and the continuation of the same which is designated $f^2$, and which is formed by the tapering of the cylinder head directly over the cylinder chamber. However, it will be understood that when I use this term "barrier" in the claims, I do not wish to be specifically restricted to a barrier enclosing any number of degrees of the upper end of the cylinder, but refer to any baffle structure which in a measure accomplishes the results that I have set out.

What I claim is:

1. In an internal combustion engine, a cylinder, a piston travelling substantially to the top of the cylinder, a combustion chamber in which substantially the entire chamber is comprehended in a relatively long passage of substantially smaller diameter than the cylinder, the axis of the long passage being substantially at right angles to the axis of the cylinder, and a spark plug together with an exhaust valve and port, and an intake valve and port located at the extreme end of such long and narrow combustion chamber remote from the piston.

2. In an internal combustion engine, an engine structure provided with a cylinder, a piston travelling in said cylinder to substantially the top thereof, a combustion chamber comprehended substantially entirely in a long and narrow passage leading into the side and the top of the cylinder and then leading away to a point offset from the cylinder, and a spark plug at the extreme end of said offset portion of the combustion chamber, and an intake valve and port, and an exhaust valve and port located below the intake and adjacent said spark plug at such extreme end of the combustion chamber which is offset from the cylinder.

3. In an internal combustion engine, the combination of an engine block provided with a cylinder, a piston reciprocating in the cylinder, an engine head cored out to provide a combustion chamber communicating with the top of the cylinder but of considerably less diameter than the cylinder thereby forming a barrier around the top of the cylinder, said combustion chamber extending horizontally and downwardly to an offset point with respect to the cylinder and exhaust and intake valves and ports and a spark plug all located on the offset portion of the combustion chamber.

4. In an internal combustion engine, the combination of an engine structure provided with a cylinder, a piston reciprocating in the cylinder, the said engine structure also provided with a combustion chamber having one end offset from the cylinder and relatively long and narrow and passing upwardly from the offset end and then turning downwardly and entering the top of the cylinder, thereby forming a barrier into the cylinder and a spark plug at the extreme offset end of the combustion chamber.

5. In an internal combustion engine, the combination of an engine structure provided with a cylinder, a piston reciprocating in the cylinder, the said engine structure also provided with a combustion chamber having one end offset from the cylinder and relatively long and narrow and passing upwardly from the offset end and then turning downwardly and entering the top of the cylinder, thereby forming a barrier into the cylinder, a spark plug at the extreme offset end of the combustion chamber, an intake valve and port entering the offset portion above, and an exhaust valve and port entering the offset portion below.

6. In an internal combustion engine, an engine structure provided with a cylinder and provided with a combustion chamber having a portion offset to the side of the cylinder, said structure provided with an upgoing intake track which turns at its top and opens into the top of the combustion chamber at the offset end and an intake valve guarding such port leading into the chamber, and a piston reciprocating in the cylinder.

7. In an internal combustion engine, an engine structure provided with a cylinder and forming a combustion chamber which leads into the top of the cylinder and has one end offset from the side of the cylinder, the said structure being cored to provide an intake passage that runs upwardly over the said offset end of the combustion chamber and turns and discharges into the top of the combustion chamber at such offset end and said structure also provided with an exhaust passage discharging from the offset end of the chamber directly below the intake port, and valves guarding said ports.

8. In an internal combustion engine, an engine structure provided with a cylinder and forming a combustion chamber which leads into the top of the cylinder and has one end offset from the side of the cylinder, the said structure being cored to provide an intake passage that runs upwardly over the said end of the combustion chamber and turns and discharges into the top of the combustion chamber at the offset end, said structure further provided with an exhaust passage discharging from the offset end of the chamber directly below the intake port, valves guarding said ports, and a spark plug located at the offset end of said combustion engine chamber between the two valves.

In testimony whereof I have affixed my signature.

EVERETT B. CUSHMAN.